United States Patent
Zhang et al.

(10) Patent No.: US 9,759,607 B2
(45) Date of Patent: Sep. 12, 2017

(54) OPTICAL WAVELENGTH IDENTIFYING SYSTEM

(71) Applicants: Tsinghua University, Beijing (CN); HON HAI PRECISION INDUSTRY CO., LTD., New Taipei (TW)

(72) Inventors: Ling Zhang, Beijing (CN); Lei Deng, Beijing (CN); Yang Wu, Beijing (CN); Kai-Li Jiang, Beijing (CN); Jia-Ping Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/409,822

(22) Filed: Jan. 19, 2017

(65) Prior Publication Data
US 2017/0211980 A1     Jul. 27, 2017

(30) Foreign Application Priority Data
Jan. 22, 2016 (CN) .......................... 2016 1 0042562

(51) Int. Cl.
*G01J 4/00* (2006.01)
*G01J 3/50* (2006.01)
*G01J 3/02* (2006.01)

(52) U.S. Cl.
CPC .............. *G01J 3/50* (2013.01); *G01J 3/0224* (2013.01); *G01J 2003/507* (2013.01)

(58) Field of Classification Search
CPC ...................................................... G01J 4/00
USPC ........................................................ 356/364
See application file for complete search history.

(56) References Cited

U.S. PATENT DOCUMENTS

| | | | | |
|---|---|---|---|---|
| 7,915,598 B2 * | 3/2011 | Jiang | ...................... | G10K 15/04 250/472.1 |
| 8,030,623 B2 * | 10/2011 | Jiang | ...................... | G10K 15/04 250/472.1 |
| 2010/0019159 A1 * | 1/2010 | Jiang | ...................... | G10K 15/04 250/370.01 |
| 2010/0019171 A1 * | 1/2010 | Jiang | ...................... | G10K 15/04 250/473.1 |

* cited by examiner

*Primary Examiner* — Roy M Punnoose
(74) *Attorney, Agent, or Firm* — Steven Reiss

(57) ABSTRACT

An optical wavelength identifying system comprises an optical wavelength detecting device, a memory, a modulator, a comparison module, and an instruction module. The optical wavelength detecting device comprises a polarizer, a detecting element, a measuring device and a data processor. The polarizer is configured to transform an incident light into a polarized light. The detecting element is configured to form a temperature difference or a potential difference, wherein the detecting element comprises a carbon nanotube structure comprising a plurality of carbon nanotubes oriented along the same direction. The measuring device is electrically connected to the detecting element and configured to measure the temperature difference or the potential difference. The data processor is electrically connected to the measuring device and configured to obtain the optical wavelength by calculating and analyzing the temperature difference or the potential difference.

12 Claims, 8 Drawing Sheets

_(57)_

OPTICAL WAVELENGTH IDENTIFYING SYSTEM

CROSS-REFERENCE TO RELATED APPLICATIONS

This application claims all benefits accruing under 35 U.S.C. §119 from China Patent Application No. 201610042562.1, filed on Jan. 22, 2016, in the China Intellectual Property Office, the disclosure of which is incorporated herein by reference.

FIELD

The subject matter herein generally relates to an optical wavelength identifying system.

BACKGROUND

It has always been an interesting topic for people to explore usages of specific wavelengths of light. For example, the light can show different colors because of different wavelengths of light, and the light can be directly used as indicator tools in our life. Certainly, the light having specific wavelength can be applied to many fields. But in the study of the specific wavelength of light application, it is necessary to be able to measure the wavelength simply and accurately.

Currently, there are some methods of measuring the specific wavelength, such as measurement using light interference, or measurement using light diffraction. But these methods are carried out manually and complicated, and workers who carry out these methods must have high levels. Also, measurement errors of these methods are large, and the measurement scale is limited. The detection equipment related to these methods are very big and complicated.

What is needed, therefore, is to provide a system for identifying optical wavelength for solving the problem discussed above.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views. Implementations of the present technology will now be described, by way of example only, with reference to the attached figures, wherein.

DETAILED DESCRIPTION

Figure 1:
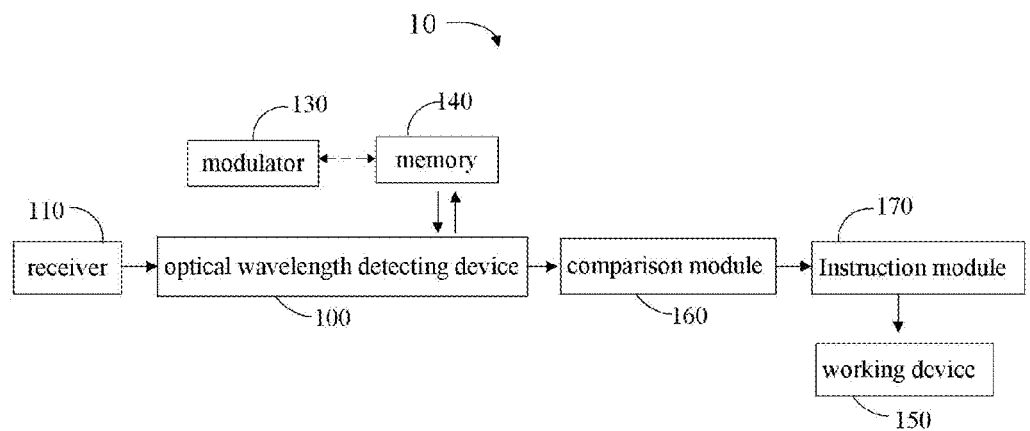
FIG. 1 is a schematic view of an optical wavelength identifying system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "substantially" is defined to be essentially conforming to the particular dimension, shape or other word that substantially modifies, such that the component need not be exact. The term "comprising" means "including, but not necessarily limited to"; it specifically indicates open-ended inclusion or membership in a so-described combination, group, series and the like. It should be noted that references to "an" or "one" embodiment in this disclosure are not necessarily to the same embodiment, and such references mean at least one.

Referring to FIG. 1, an optical wavelength identifying system 10 comprises a receiver 110, an optical wavelength detecting device 100, a modulator 130, a memory 140, a comparison module 160 and an instruction module 170. The receiver 110 is used for collecting incident light and transmitting the incident light to the optical wavelength detecting device 100. The optical wavelength detecting device 100 is used for converting and calculating the incident light to obtain optical wavelength. The memory 140 is used to store standard data in a standard database of transmittance-angle-wavelength values and a predetermined value. The modulator 130 is used to set or reset the predetermined value. The comparison module 160 is configured to compare the optical wavelength with the predetermined value to obtain a comparison result. The instruction module 170 is used to send work instructions according to the comparison result.

The receiver 110 is used for collecting the incident light. For example, a divergent light can be collected into a beam of light by the receiver 110. It can be understood that the receiver 110 is not necessary when the incident light gathers well. The receiver 110 is a device that can collect light, such as a concave mirror. In one embodiment, the receiver 110 is a concave mirror.

The optical wavelength detecting device 100 is used for converting and calculating the incident light to obtain optical wavelength. The optical wavelength detecting device 100 can convert the incident light into a potential difference or a temperature difference. The optical wavelength of the incident light can be obtained by analyzing and calculating the potential difference or temperature difference.

Figure 2:
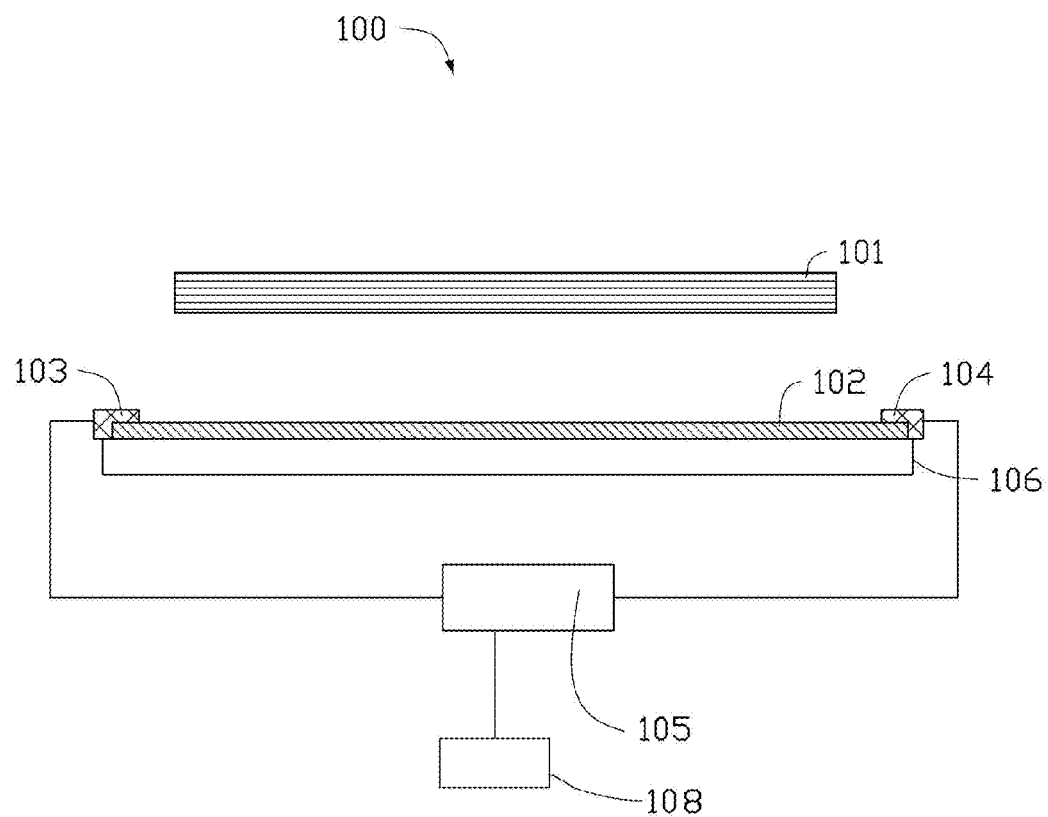
FIG. 2 is a schematic view of one embodiment of an optical wavelength detecting device.

Referring to FIG. 2, the optical wavelength detecting device 100 comprises a polarizer 101, a detecting element 102, a first electrode 103, a second electrode 104, a measuring device 105 and a data processor 108. The polarizer 101 is spaced from the detecting element 102 and used for generating polarized light. The first electrode 103 and the second electrode 104 are spaced apart from each other and electrically connected to the detecting element 102. The detecting element 102 is electrically connected to the measuring device 105 by the first electrode 103 and the second electrode 104. The detecting element 102 comprises a carbon nanotube structure. The carbon nanotube structure comprises a plurality of carbon nanotubes oriented along the same direction and is in direct contact with the first electrode 103 and the second electrode 104. The measuring device 105 is electrically connected to the first electrode 103 and the second electrode 104. The data processor 108 is connected to the measuring device 105.

The polarizer 101 and the detecting element 102 are parallel and spaced from each other. The polarized light emitting from the polarizer 101 can irradiate the carbon nanotube structure of the detecting element 102. An oriented direction of the carbon nanotubes of the carbon nanotube structure can be the same as a direction from the first electrode 103 to the second electrode 104. The measuring device 105 is used to measure a temperature difference or potential difference of the carbon nanotube structure. A light transmittance can be obtained by calculating the difference of temperature or potential, and the optical wavelength can be obtained by reading the light transmittance.

The polarizer 101 is used for transforming light into polarized light. The polarizer 101 can be any kinds of materials that can transform light into polarized light. The polarizer 101 can be yttrium aluminate, iodine, calcite or any other suitable material. The polarizer 101 can be a rotatable structure to form any angles between a polarized light direction and the oriented direction of the carbon nanotubes. The polarizer 101 can be rotated in a plane of the polarizer 101 to alter the angles between the direction of the polarized light and the oriented direction of the carbon nanotubes. Thus the angles between the polarized light direction and the oriented direction of the carbon nanotubes can be at any value in 0-90 degree.

The detecting element 102 comprises the carbon nanotube structure. The carbon nanotube structure comprises a plurality of carbon nanotubes oriented along the same direction. The oriented direction of carbon nanotubes is parallel with a carbon nanotube structure surface. In one embodiment, the detecting element 102 is a carbon nanotube layer, and the carbon nanotube layer consists of a plurality of carbon nanotubes, joined to each other end to end by van der Waals attractive force. The carbon nanotubes in the carbon nanotube structure can be single-walled, double-walled, or multi-walled carbon nanotubes. A diameter of each single-walled carbon nanotube ranges from about 0.5 nanometers (nm) to about 10 nm. A diameter of each double-walled carbon nanotube ranges from about 1 nm to about 15 nm. A diameter of each multi-walled carbon nanotube ranges from about 1.5 nm to about 50 nm. The carbon nanotubes can be N-type carbon nanotubes or P-type carbon nanotubes.

The carbon nanotube structure can be a free-standing structure. The free-standing structure is that the carbon nanotube structure can keep a certain shape without any supporter, which is different from powder or liquid. The carbon nanotube structure comprises a plurality of carbon nanotubes joined to each other by van der Waals attractive force, thereby forming a certain shape. When the carbon nanotube structure is a free-standing structure, the detecting element 102 can be suspended. The carbon nanotube structure comprises at least one carbon nanotube film, at least one carbon nanotube wire structure, or a combination thereof. The carbon nanotube structure is a layer structure of a plurality of parallel arrangement carbon nanotubes.

Carbon Nanotube Film

Figure 3:
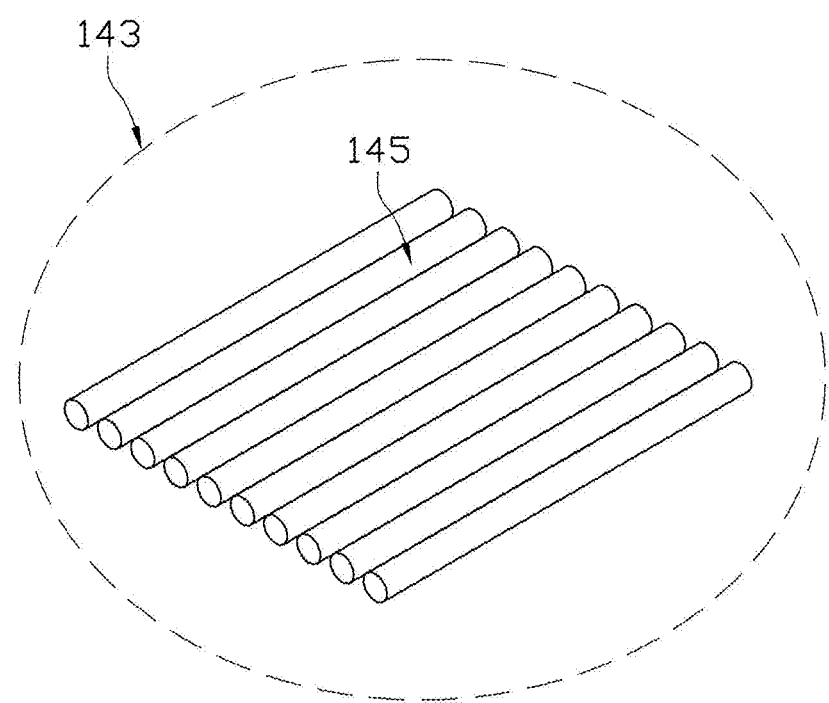
FIG. 3 is a structural schematic view of one embodiment of a drawn carbon nanotube film.

In one embodiment, the carbon nanotube film comprises at least one carbon nanotube segment. Referring to FIG. 3, each carbon nanotube segment 143 comprises a plurality of carbon nanotubes 145 approximately parallel to each other, and combined by van der Waals attractive force. The carbon nanotube segments 143 can vary in width, thickness, uniformity, and shape. The carbon nanotubes 145 in the carbon nanotube segments 143 are also oriented along a preferred orientation.

Carbon Nanotube Film Manufactured by Method 1

Figure 4:
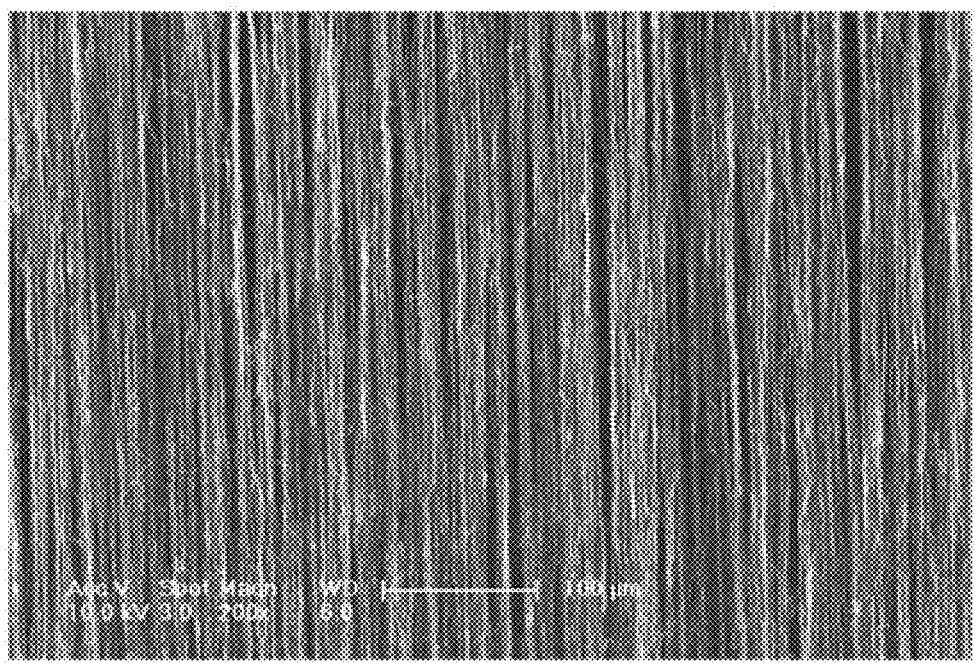
FIG. 4 shows a Scanning Electron Microscope (SEM) image of one embodiment of the drawn carbon nanotube film.

In one embodiment, the carbon nanotube film can be drawn from a carbon nanotube array, to form a drawn carbon nanotube film. In the present embodiment, the drawn carbon nanotube film can be pulled out from a super-aligned carbon nanotube array on a substrate. The drawn carbon nanotube film comprises a plurality of successive and oriented carbon nanotubes 145 joined end to end by van der Waals attractive force. Referring to FIG. 4, each drawn carbon nanotube film comprises a plurality of successively oriented carbon nanotube segments 143 joined end-to-end by van der Waals attractive force. The thickness of the drawn carbon nanotube film is in a range from about 0.5 nm to about 100 micrometers (μm). Examples of a drawn carbon nanotube film are taught by U.S. Pat. No. 7,045,108 to Jiang et al., and WO 2007015710 to Zhang et al.

Carbon Nanotube Film Manufactured by Method 2

In another embodiment, the carbon nanotube film comprises one carbon nanotube segment 143. Referring to FIG. 4, the carbon nanotube segment 143 comprises a plurality of carbon nanotubes 145 substantially arranged along the same direction. The carbon nanotubes 145 in the carbon nanotube film are substantially parallel to each other and have almost equal lengths, and are combined side by side via van der Waals attractive force. The width of the carbon nanotube film is equal to the length of the carbon nanotubes 145, thus at least one carbon nanotube 145 spans the entire width of the carbon nanotube film. The carbon nanotube film can be produced by growing a strip-shaped carbon nanotube array, and pushing the strip-shaped carbon nanotube array down along a direction substantially perpendicular to a length of the strip-shaped carbon nanotube array, and has a length of about 20 μm to about 10 millimeters (mm). The length of the carbon nanotube film is only limited by the length of the strip. A larger carbon nanotube film also can be formed by having a plurality of the strips lined up side by side and folding the carbon nanotubes 145 grown thereon over such that there is overlap between the carbon nanotubes 145 on adjacent strips.

Carbon Nanotube Film Manufactured by Method 3

In some embodiments, the carbon nanotube film comprising one carbon nanotube segment 143 can also be produced by a method adopting a "kite-mechanism." The carbon nanotube film can have carbon nanotubes 145 with a length greater than 10 centimeters (cm). The carbon nanotube film can be produced by providing a growing substrate with a catalyst layer located thereon, placing the growing substrate adjacent to the insulating substrate in a chamber, heating the chamber to a growth temperature for carbon nanotubes 145 under a protective gas, introducing a carbon source gas along a gas flow direction, and growing a plurality of carbon nanotubes 145 on the insulating substrate. After introducing the carbon source gas into the chamber, the carbon nanotubes 145 will start to grow under the effect of the catalyst. One end (e.g., the root) of the carbon nanotubes 145 is kept unchanged on the growing substrate, and the other end (e.g., the top/free end) of the carbon nanotubes 145 will grow continuously. The growing substrate is near an inlet of the introduced carbon source gas, such that the carbon nanotubes 145 floats above the insulating substrate with the roots of the carbon nanotubes 145 still attached on the growing substrate, as the carbon source gas is continuously introduced into the chamber. The length of the carbon nanotubes 145 depends on the growth conditions. After growth has been stopped, the carbon nanotubes 145 are located entirely on the insulating substrate. The carbon nanotubes 145 roots are then separated from the growing substrate. This can be repeated many times to obtain many layers of carbon nanotube films on a single insulating substrate. The adjacent carbon nanotubes 145 can be adhered together by van der Waals attractive force and being substantially parallel to each other, with a distance of adjacent carbon nanotubes 145 being less than 5 µm.

The carbon nanotube structure can comprise at least two stacked and/or coplanar carbon nanotube films. These coplanar carbon nanotube films can also be stacked one upon other films. The carbon nanotubes 145 in two adjacent carbon nanotube films are substantially parallel. Adjacent carbon nanotube films can be combined only by the van der Waals attractive force. The number of layers of the carbon nanotube films is not limited so that a carbon nanotube structure can have different widths and areas. Stacking the carbon nanotube films will add to the structural strength of the carbon nanotube structure.

Carbon Nanotube Wire Structure

In other embodiments, the carbon nanotube structure comprises one or more carbon nanotube wire structures. The carbon nanotube wire structure comprises carbon nanotube cables that comprise of twisted carbon nanotube wires, untwisted carbon nanotube wires, or combinations thereof. The carbon nanotube cable comprises two or more carbon nanotube wires, twisted or untwisted that are twisted or bundled together. The carbon nanotube wires in the carbon nanotube wire structure can be substantially parallel to each other to form a bundle-like structure or twisted with each other to form a twisted structure. When the carbon nanotube structure comprises a plurality of carbon nanotube wire structures, the carbon nanotube wire structures can be coplanar and substantially parallel to each other, or stacked and substantially parallel to each other. When the carbon nanotube structure comprises one carbon nanotube wire structure, the carbon nanotube wire structure bends orderly in a surface, thereby forming a planar structure, and the carbon nanotube wires of the carbon nanotube wire structure are substantially parallel to and connect to each other and arranged.

Figure 5:
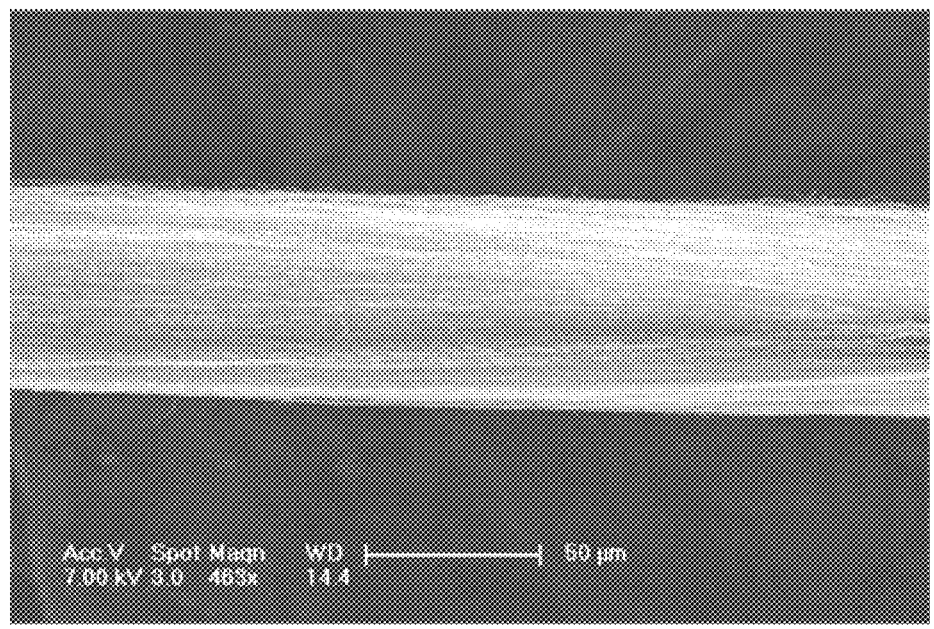
FIG. 5 is a SEM image of one embodiment of a non-twisted carbon nanotube wire.

The non-twisted carbon nanotube wire can be formed by treating the drawn carbon nanotube film with an organic solvent. The drawn carbon nanotube film is treated by applying the organic solvent to the drawn carbon nanotube film to soak the entire surface of the drawn carbon nanotube film. After being soaked by the organic solvent, the adjacent parallel carbon nanotubes in the drawn carbon nanotube film will bundle together, due to the surface tension of the volatile organic solvent as the organic solvent volatilizes, and thus, the drawn carbon nanotube film will be shrunk into a non-twisted carbon nanotube wire. Referring to FIG. 5, the non-twisted carbon nanotube wire comprises a plurality of carbon nanotubes substantially oriented along the same direction (e.g., a direction along the length of the non-twisted carbon nanotube wire). The carbon nanotubes are substantially parallel to the axis of the non-twisted carbon nanotube wire. The non-twisted carbon nanotube wire comprises a plurality of carbon nanotube segments joined end-to-end by van der Waals attractive force. Each carbon nanotube segment comprises a plurality of carbon nanotubes substantially parallel to each other and combined by van der Waals attractive force. A length of the non-twisted carbon nanotube wire can be arbitrarily set as desired. A diameter of the non-twisted carbon nanotube wire can range from about 0.5 nm to about 100 µm. In one embodiment, the diameter of the non-twisted carbon nanotube wire is about 50 µm. Examples of the non-twisted carbon nanotube wire are taught by US Patent Application Publication US 2007/0166223 to Jiang et al.

Figure 6:
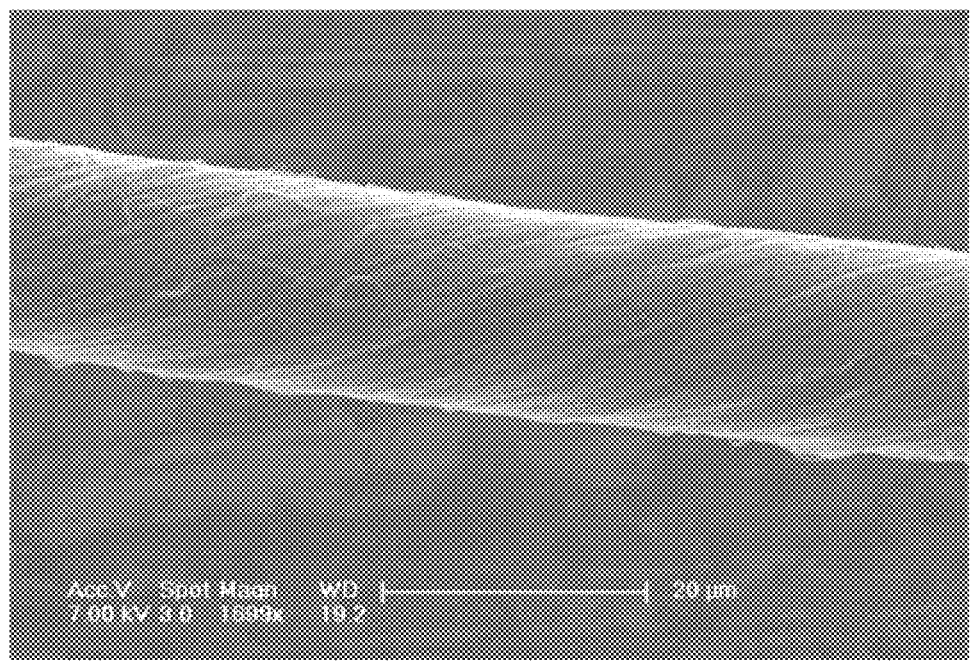
FIG. 6 is a SEM image of one embodiment of a twisted carbon nanotube wire.

The twisted carbon nanotube wire can be formed by twisting a drawn carbon nanotube film by using a mechanical force to turn the two ends of the drawn carbon nanotube film in opposite directions. Referring to FIG. 6, the twisted carbon nanotube wire comprises a plurality of carbon nanotubes oriented along an axial direction of the twisted carbon nanotube wire. The carbon nanotubes are aligned in a helix around the axis of the carbon nanotube twisted wire. More specifically, the twisted carbon nanotube wire comprises a plurality of successive carbon nanotube segments joined end-to-end by van der Waals attractive force. Each carbon nanotube segment comprises a plurality of carbon nanotubes substantially parallel to each other and combined by van der Waals attractive force. The carbon nanotube segment has arbitrary length, thickness, uniformity, and shape. A length of the carbon nanotube wire can be arbitrarily set as desired. A diameter of the twisted carbon nanotube wire can range from about 0.5 nm to about 100 µm. Further, the twisted carbon nanotube wire can be treated with a volatile organic solvent, before or after being twisted. After being soaked by the organic solvent, the adjacent parallel carbon nanotubes in the twisted carbon nanotube wire will bundle together, due to the surface tension of the organic solvent as the organic solvent volatilizes. The specific surface area of the twisted carbon nanotube wire will decrease, but the density and strength of the twisted carbon nanotube wire will increase. It is understood that the twisted and non-twisted carbon nanotube cables can be produced by methods that are similar to the methods of making twisted and non-twisted carbon nanotube wires.

In one embodiment, the carbon nanotube structure is composed of at least one carbon nanotube film and at least one carbon nanotube wire structure. The carbon nanotubes in the carbon nanotube film are substantially parallel to the carbon nanotube wire structures.

The thickness of the carbon nanotube structure can be selected as desired. The carbon nanotube structure is thick enough to guarantee that the detecting element 102 can detect the wavelength and the measured error is small. In one embodiment, the thickness of the carbon nanotube structure can range from about 0.5 nm to about 5 µm. The thickness of the carbon nanotube structure cannot be too thick (greater than 5 µm). If the thickness of the carbon nanotube structure is greater than 5 µm, because the incident light cannot pass through the carbon nanotube structure, a part of the carbon nanotubes cannot be irradiated by the light. The optical wavelength detecting device 100 has a large measurement error.

Figure 7:
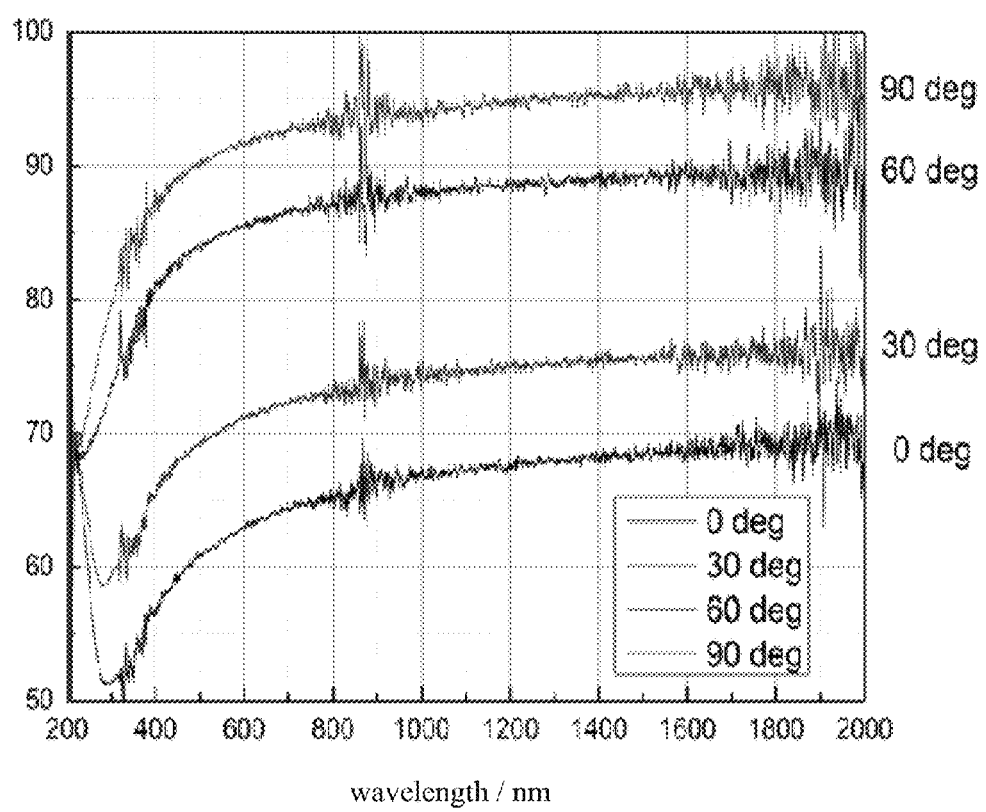
FIG. 7 is a diagram showing a relationship between a light transmittance of a carbon nanotube structure and an optical wavelength.

Referring to FIG. 7, in the carbon nanotube structure, the carbon nanotubes are substantially parallel and extend along the same direction, the polarized light is selectively absorbed by the carbon nanotube structure according to the polarized light direction and polarized light wavelength. As an angle between the polarized light direction and the carbon nanotubes is unchanged, the polarized light transmittance increases monotonously as the wavelength increases. When the polarized light wavelength is kept unchanged, the angle changes can make the polarized light transmittance being changed. When the polarizing direction is substantially parallel to the carbon nanotubes orientation, the polarized light is easily absorbed by the carbon nanotube structure, so the polarized light transmittance is very low. When the polarizing direction is substantially perpendicular to the carbon nanotubes orientation, the polarized light can pass through the carbon nanotube structure easily, so the polarized light transmittance is very high. Due to the polarized light absorbed by the carbon nanotube structure can be converted into heat energy, the heat energy can produce temperature difference in the carbon nanotube structure and the temperature difference can change into the potential difference. The carbon nanotube structure can measure the polarized light wavelength as the temperature and voltage changes.

Figure 8:
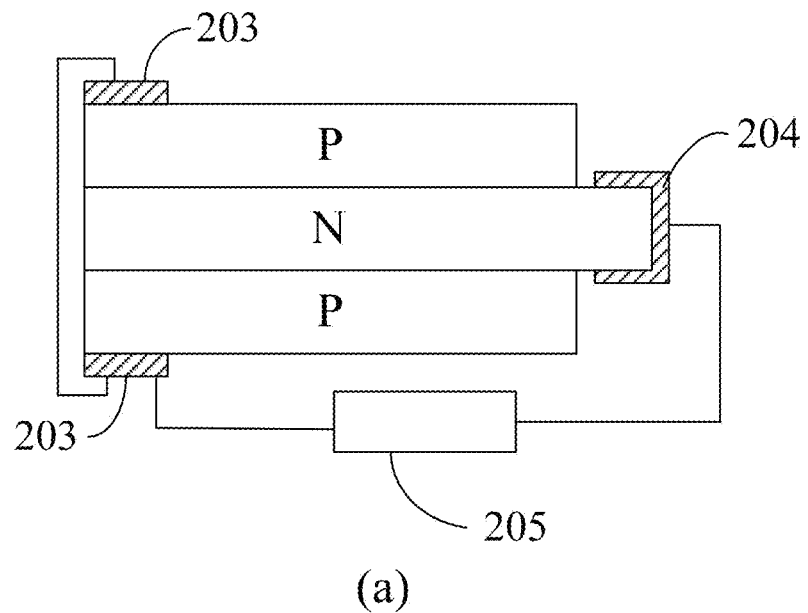
FIG. 8 is a schematic view of stacked arrangements of semiconductor carbon nanotube layers.
Figure 8:
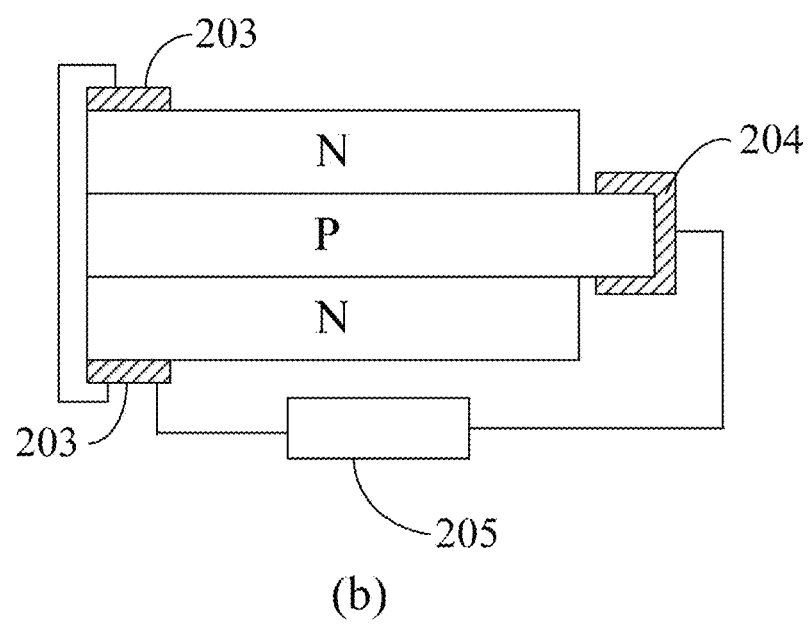

The carbon nanotube structure further comprises a P-N junction composed of a P-type semiconductor carbon nanotube layer 2021 and an N-type semiconductor carbon nanotube layer 2022. The P-type semiconductor carbon nanotube layer 2021 and the N-type semiconductor carbon nanotube layer 2022 can be stacked with each other or arranged side by side in the same plane. When the P-type semiconductor carbon nanotube layer 2021 and the N-type semiconductor carbon nanotube layer 2022 are arranged side by side in the same plane, the oriented direction of carbon nanotubes in the P-type semiconductor carbon nanotube layer 2021 is the same as the oriented direction of carbon nanotubes in the N-type semiconductor carbon nanotube layer 2022. And a contact surface of the P-type semiconductor carbon nanotube layer 2021 and the N-type semiconductor carbon nanotube layer 2022 is perpendicular to the oriented direction of carbon nanotubes. When the P-type semiconductor carbon nanotube layer 2021 and the N-type semiconductor carbon nanotube layer 2022 are stacked with each other, the contact surface of the P-type semiconductor carbon nanotube layer 2021 and the N-type semiconductor carbon nanotube layer 2022 is parallel to the oriented direction of carbon nanotubes. Referring to FIG. 8, the stacked arrangement can also be sandwich structure, such as P-N-P or N-P-N. It is necessary to satisfy that the P-type semiconductor carbon nanotube layer 2021 and the N-type semiconductor carbon nanotube layer 2022 are electrically connected to the first electrode 203 and the second electrode 204. When the N-type semiconductor carbon nanotube layer is sandwiched between a first P-type semiconductor carbon nanotube layer and a second P-type semiconductor carbon nanotube layer, a first part of the N-type semiconductor carbon nanotube layer extends to the outside of the two P-type semiconductor carbon nanotube layers to form an exposed part, and the exposed part of the N-type semiconductor carbon nanotube layer is coated by the second electrode 204. Additionally, the first electrode 203 comprises a first electrode unit and a second electrode unit, the first electrode unit is located on a second part of the first P-type semiconductor carbon nanotube layer, the second electrode unit is located on a third part of the second P-type semiconductor carbon nanotube layer. And the first electrode unit and the second electrode unit are electrically connected with each other. When the P-type semiconductor carbon nanotube layer is sandwiched between a first N-type semiconductor carbon nanotube layer and a second N-type semiconductor carbon nanotube layer, a first part of the P-type semiconductor carbon nanotube layer extends to the outside of the two N-type semiconductor carbon nanotube layers to form an exposed part, and the exposed part of the P-type semiconductor carbon nanotube layer is coated by the second electrode 204. And the first electrode 203 comprises a first electrode unit and a second electrode unit, the first electrode unit is located on a second part of the first N-type semiconductor carbon nanotube layer, the second electrode unit is located on a third part of the second N-type semiconductor carbon nanotube layer. And the first electrode unit and the second electrode unit are electrically connected with each other. In one embodiment, the P-type semiconductor carbon nanotube layer 2021 and the N-type semiconductor carbon nanotube layer 2022 are arranged side by side in the same plane.

When the carbon nanotube structure containing P-N junction is irradiated by the incident light, the incident light energy is directly converted into electrical energy and is not converted into heat energy. The temperature difference between a portion of the carbon nanotube structure irradiated with the incident light and a non-irradiated portion is small and negligible. In one embodiment, the effect of incident light on carbon nanotubes is changed from thermoelectric effect to photoelectric effect, which reduced the loss of intermediate energy. The structure with P-N junction enhances the sensitivity of the carbon nanotube structure to the incident light, thus the measurement of the device is more accurate.

In one embodiment, the detecting element 102 can further comprise an insulating substrate 106 for supporting the carbon nanotube structure. The carbon nanotube structure is located on an insulating substrate 106 surface. The insulating substrate 106 material can be rigid materials (e.g., p-type or n-type silicon, silicon with a silicon dioxide layer formed thereon, crystal, crystal with an oxide layer formed thereon), or flexible materials (e.g., plastic or resin). The insulating substrate 106 material can be polyethylene terephthalate, polyethylene naphthalate two formic acid glycol ester (PEN), or polyimide. In one embodiment, the detecting element 102 comprises an insulating substrate 106, and the insulating substrate 106 material is poly ethylene terephthalate.

In one embodiment, the detecting element 102 can be rotated freely in the detecting element plane to form different angles between the polarized light direction and the carbon nanotubes orientation. The polarizer 101 can also be rotated freely in the polarizer 101 plane to adjust the angles between the polarized light direction and the carbon nanotubes orientation.

The first electrode 103 and the second electrode 104 are made of conductive material. The first electrode 103 or the second electrode 104 shape is not limited and can be lamellar, rod, wire, block, or other shapes. A first and second electrodes 103, 104 material can be one metal or more metals, conductive adhesive, carbon nanotube, indium tin oxide, or other material. In one embodiment, the first electrode 103 and the second electrode 104 are rod-shaped metal electrodes. The carbon nanotubes in the carbon nanotube structure extend along a direction from the first electrode 103 to the second electrode 104. Some carbon nanotube structures have large specific surface area and better adhesion ability under the effect of the van der Waals attractive force and can be adhered directly to the first electrode 103 and the second electrode 104. This will result in good electrical contact between the carbon nanotube structure and the first and second electrodes 103, 104. Furthermore, a conductive adhesive layer (not shown) can be further provided between the first electrode 103 and/or the second electrode 104 and the carbon nanotube structure. The conductive adhesive layer can be applied to the carbon nanotube structure surface to provide electrical contact and better adhesion between the first and second electrodes 103, 104 and the carbon nanotube structure.

The measuring device 105 can be a voltage measuring device to measure the carbon nanotube structure voltage differences or a thermocouple device to measure the temperature differences of the carbon nanotube structure. The measuring device 105 can be electrically connected to the carbon nanotube structure by the first electrode 103 and the second electrode 104, thus a circuit is formed. When the carbon nanotube structure generates a potential between the first electrode 103 and the second electrode 104 because of the temperature difference, the carbon nanotube structure is equivalent to a power, and a current is generated in the circuit. The measuring device 105 can measure the carbon nanotube structure potential directly without any other power supply device. When the measuring device 105 is the thermocouple device, the thermocouple device can measure the temperature difference between the opposite two ends of the carbon nanotube structure. A measuring position can be selected as desired. When the polarized light irradiates a first part surface of the carbon nanotube structure, a first point in the first part surface which is irradiated is selected, a second point in a second part surface which is not irradiated is selected, the measuring device 105 measures the temperature difference or the potential difference between the first point and the second point. The carbon nanotube structure can further comprise a P-type semiconductor carbon nanotube layer and an N-type semiconductor carbon nanotube layer in contact with each other to form a P-N junction. A third point in the P-type semiconductor carbon nanotube layer is selected, a fourth point in the N-type semiconductor carbon nanotube layer is selected. The measuring device 105 can only measure the potential difference between the third point and the fourth point when the polarized light irradiates the P-N junction.

The data processor 108 is used to obtain the optical wavelength by calculating and analyzing the temperature difference or the potential difference. The data processor 108 comprise a database of transmittance-angle-wavelength values and can calculate the temperature difference or the potential difference to obtain the polarized light transmittance. Then the optical wavelength can be obtained according to the values of transmittance in the database of transmittance-angle-wavelength values.

The principle of measuring the optical wavelength by using the optical wavelength detecting device 100 can be further described in detail. Firstly, a beam of incident light is provided, and the incident light power is determined. The power is set to P, and the optical wavelength is set to λ. Secondly, the polarized light is formed by using the polarizer 101 to polarize the incident light. There is an amount of energy loss during the incident light passing through the polarizer 101. A transmittance of the polarizer is set to α. Referring to FIG. 7, as the angle between the polarized light direction and the carbon nanotubes changes, the polarized light transmittances are different. The transmittance is set to T. When the polarizing direction is substantially parallel to the carbon nanotubes orientation, the transmittance is set to $T_{\lambda II}$. When the polarizing direction is substantially perpendicular to the carbon nanotubes orientation, the transmittance is set to $T_{\lambda \perp}$. When the polarized light irradiates the carbon nanotube structure, an electric potential is produced by the temperature difference induced in the carbon nanotube structure. An energy conversion efficiency is set to β. The energy conversion efficiency β is only related to devices comprising carbon nanotubes and is not related to the carbon nanotubes orientation.

So a potential difference U of both carbon nanotube structure ends is defined by a formula (1), $$u=\sqrt{PR\alpha\beta(1-T)} \quad (1)$$

R is a carbon nanotube structure resistance. The carbon nanotube structure resistance is approximately unchanged despite the temperature variation range is not large. At the same time, a carbon nanotube structure has been determined, the resistance is kept unchanged and isn't related to the polarization direction of light and wavelength.

The polarizing direction is substantially parallel to the carbon nanotubes orientation, the potential difference of the carbon nanotube structure is $U_{II}$, $$U_{II}=\sqrt{PR\alpha\beta(1-T_{\lambda II})}.$$

The polarizing direction is substantially perpendicular to the carbon nanotubes orientation, the potential difference of the carbon nanotube structure is $U_{\perp}$, $$U_{\perp}=\sqrt{PR\alpha\beta(1-T_{\lambda\perp})}$$

K is defined, $$K = \frac{U_{II}}{U_{\perp}},$$

$$K = \frac{U_{II}}{U_{\perp}} = \sqrt{\frac{1-T_{\lambda II}}{1-T_{\lambda\perp}}} = \sqrt{\frac{1-T_{\lambda\perp}+T_{\lambda\perp}-T_{\lambda II}}{1-T_{\lambda\perp}}} = \sqrt{1+\frac{T_{\lambda\perp}-T_{\lambda II}}{1-T_{\lambda\perp}}}$$

When the angle between the carbon nanotubes orientation and polarizing direction is unchanged, a transmittance difference between arbitrary wavelength is approximately kept unchanged.

$$T_{\lambda\perp}-T_{\lambda II}=C, \text{ the } C \text{ is unchanged.}$$

$$K = \sqrt{1+\frac{T_{\lambda\perp}-T_{\lambda II}}{1-T_{\lambda\perp}}} = \sqrt{1+\frac{C}{1-T_{\lambda\perp}}} \quad (2)$$

Referring to the formula (2), the values of K and $T_{\lambda\perp}$ are monotonic. When the angle between the carbon nanotubes orientation and polarizing direction is unchanged, the value of $T_{\lambda\perp}$ increases as the wavelength increases. So the values of K and wavelength of incident light are monotonic.

A formula (3) can be obtained by changing the formula (2), $$T_{\lambda\perp} = 1 - \frac{C}{K^2-1} \quad (3)$$

Referring to the formula (3), $T_{\lambda\perp}$ can be obtained by calculating the value of K. The value of K can be obtained by calculating the values of $U_{II}$ and $U_{\perp}$ of the carbon nanotube structure under different conditions. When the angle between the carbon nanotubes orientation and polarizing direction is unchanged, the polarized light transmittance corresponds to a unique wavelength value. The optical wavelength can be obtained according to the values of transmittance in the database of transmittance-angle-wavelength values of the data processor 108. According to the Seebeck effect, U=ρ ΔT, ρ is the Seebeck coefficient and related to materials. The temperature differences change as the voltage value changes, and the wavelength value of incident light can also be calculated by the temperature differences.

The memory 140 is used to store the standard database of transmittance-angle-wavelength values and the predetermined values. And the wavelength in the standard database is equal to or greater than 300 nm. The wavelength values in the standard database are standard data, and the standard data can be provided for the subsequent measurement.

The modulator 130 is connected to the memory 140, and the modulator 130 is configured to set or reset the predetermined values. The predetermined values are chose from the standard database. The modulator 130 can also update the standard database in the memory 140.

The comparison module 160 is configured to compare the optical wavelength with the predetermined value to obtain a comparison result. The instruction module 170 is used to send work instructions according to the comparison result. Also a plurality of different predetermined values can be set to correspond to different work instructions. When the optical wavelength detected by the optical wavelength detecting device 100 is the same as one of the predetermined values, the instruction module 170 would send a work instruction.

In use, the optical wavelength identifying system 10 can be connected to a working device 150. The working device 150 is directly connected to the instruction module 170. When the specific optical wavelength identifying system 10 receive incident light, the instruction module 170 can send a work instruction to the working device 150 according to the comparison result. The working device 150 receives the work instruction and perform an operation according to the work instruction.

The optical wavelength identifying system 10 has following advantages. Due to the carbon nanotube structure composed of a plurality of carbon nanotubes, the optical wavelength can be measured by processing the light passing through the carbon nanotube structure. The method of measuring the optical wavelength is simple. The carbon nanotube structure can also play the role of power, so a special power supply is not required in the optical wavelength identifying system 10. The optical wavelength identifying system 10 structure is simple.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. An optical wavelength identifying system, the system comprising:

an optical wavelength detecting device configured to detect an optical wavelength of an incident light, comprising:
        a polarizer configured to transform the incident light into a polarized light;
        a detecting element configured to form a temperature difference or a potential difference between two points of the detecting element when exposed to the polarized light, wherein the detecting element comprises a carbon nanotube structure that comprises a plurality of carbon nanotubes oriented along a first direction, and angles between a polarizing direction of the polarized light and the first direction of the plurality of carbon nanotubes is adjustable;
        a measuring device electrically connected to the detecting element and configured to measure the temperature difference or the potential difference;
        a data processor electrically connected to the measuring device and configured to obtain the optical wavelength by calculating and analyzing the temperature difference or the potential difference;
    a memory configured to store a predetermined value and a standard database of transmittance-angle-wavelength values and predetermined values;
    a modulator configured to set or reset the predetermined value;
    a comparison module configured to compare the optical wavelength of the incident light with the predetermined value to obtain a comparison result; and
    an instruction module configured to send a work instruction according to the comparison result.

2. The system as claimed in claim 1, wherein the polarizer is rotatable to adjust the angles between the polarizing direction of the polarized light and the first direction of the plurality of carbon nanotubes.

3. The system as claimed in claim 1, further comprising a receiver for collecting the incident light.

4. The system as claimed in claim 1, wherein the detecting element is suspended.

5. The system as claimed in claim 1, wherein the detecting element is a carbon nanotube layer, and the carbon nanotube layer comprises a plurality of carbon nanotubes, connected to each other end to end by van der Waals attractive force.

6. The system as claimed in claim 1, wherein the optical wavelength detecting device further comprises a first electrode and a second electrode, and the first electrode and the second electrode are electrically connected to the carbon nanotube structure.

7. The system as claimed in claim 1, wherein the detecting element comprises a P-type semiconductor carbon nanotube layer and an N-type semiconductor carbon nanotube layer, a P-N junction is formed between the P-type semiconductor carbon nanotube layer and the N-type semiconductor carbon nanotube layer, and the measuring device is respectively electrically connected to the P-type semiconductor carbon nanotube layer and the N-type semiconductor carbon nanotube layer.

8. The system as claimed in claim 7, wherein the P-type semiconductor carbon nanotube layer and the N-type semiconductor carbon nanotube layer are stacked with each other.

9. The system as claimed in claim 8, wherein the N-type semiconductor carbon nanotube layer is sandwiched between a first P-type semiconductor carbon nanotube layer and a second P-type semiconductor carbon nanotube layer, a first part of the N-type semiconductor carbon nanotube layer extends to the outside of the two P-type semiconductor carbon nanotube layers to form an exposed part, and the exposed part of the N-type semiconductor carbon nanotube layer is coated by the second electrode; the first electrode comprises a first electrode unit and a second electrode unit, the first electrode unit is located on a second part of the first P-type semiconductor carbon nanotube layer, the second electrode unit is located on a third part of the second P-type semiconductor carbon nanotube layer, and the first electrode unit and the second electrode unit are electrically connected with each other.

10. The system as claimed in claim 8, wherein the P-type semiconductor carbon nanotube layer is sandwiched between a first N-type semiconductor carbon nanotube layer and a second N-type semiconductor carbon nanotube layer, a first part of the P-type semiconductor carbon nanotube layer extends to the outside of the two N-type semiconductor carbon nanotube layers to form an exposed part, and the exposed part of the P-type semiconductor carbon nanotube layer is coated by the second electrode; and the first electrode comprises a first electrode unit and a second electrode unit, the first electrode unit is located on a second part of the first N-type semiconductor carbon nanotube layer, the second electrode unit is located on a third part of the second N-type semiconductor carbon nanotube layer, and the first electrode unit and the second electrode unit are electrically connected with each other.

11. The system as claimed in claim 6, wherein the P-type semiconductor carbon nanotube layer and the N-type semiconductor carbon nanotube layer are arranged side by side in the same plane.

12. The system as claimed in claim 1, wherein the measuring device is a voltage measuring device or a thermocouple device configured to measure voltage differences or temperature differences.

* * * * *